(12) United States Patent
Na et al.

(10) Patent No.: US 12,298,036 B2
(45) Date of Patent: May 13, 2025

(54) BURIED TYPE AIR PURIFIER

(71) Applicant: SAMSUNG ELECTRONICS CO., LTD., Suwon-si (KR)

(72) Inventors: Seonuk Na, Suwon-si (KR); Hyunah Kim, Suwon-si (KR); Jaehyoung Sim, Suwon-si (KR); Eomji Jang, Suwon-si (KR); Sungjune Cho, Suwon-si (KR); Hyungmo Koo, Suwon-si (KR); Joonhyoung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 395 days.

(21) Appl. No.: 17/867,916

(22) Filed: Jul. 19, 2022

(65) Prior Publication Data

US 2022/0349595 A1   Nov. 3, 2022

Related U.S. Application Data

(63) Continuation of application No. PCT/KR2020/019307, filed on Dec. 29, 2020.

(30) Foreign Application Priority Data

Jan. 20, 2020   (KR) .......... 10-2020-0007499

(51) Int. Cl.
*B01D 46/10* (2006.01)
*B01D 46/00* (2022.01)
(Continued)

(52) U.S. Cl.
CPC ............ *F24F 8/10* (2021.01); *B01D 46/0002* (2013.01); *B01D 46/0047* (2013.01);
(Continued)

(58) Field of Classification Search
CPC  B01D 46/0002; B01D 46/0047; B01D 46/10; B01D 1179/70; F24F 8/10;
(Continued)

(56) References Cited

U.S. PATENT DOCUMENTS 5,958,112 A   9/1999  Nojima
6,129,781 A * 10/2000  Okamoto .............. F24F 1/0071
                                                96/28
(Continued)

FOREIGN PATENT DOCUMENTS

EP   0 818 242 B1   9/2001
JP   9-203547 A     8/1997
(Continued)

OTHER PUBLICATIONS

Machine generated English translation of JP 2001095902 A, published Apr. 10, 2001.*

(Continued)

*Primary Examiner* — Frank M Lawrence, Jr.
(74) *Attorney, Agent, or Firm* — STAAS & HALSEY LLP

(57) ABSTRACT

A buried type air purifier including a main body to be buried in a buried space through a buried opening provided on a boundary surface between a use space and the buried space, the main body having an intake passage and a discharge passage which take in and discharge air, respectively; a fan to guide air of the use space along the intake passage and the discharge passage; and a filter to filter the air. The main body includes: a first main body part having a fan accommodating part to accommodate the fan; and a second main body part having a cross sectional area, which is parallel with the boundary surface, being smaller than the first main body part, where the second main body part is formed to pass the intake and discharge passages through which the air guided (Continued)

via the fan accommodated in the fan accommodating part passes.

14 Claims, 26 Drawing Sheets

(51) Int. Cl.
  *F24F 8/10* (2021.01)
  *F24F 13/14* (2006.01)
  *F24F 13/20* (2006.01)
(52) U.S. Cl.
  CPC .............. *F24F 13/14* (2013.01); *F24F 13/20* (2013.01); *B01D 2279/50* (2013.01)
(58) Field of Classification Search
  CPC .. F24F 8/108; F24F 13/14; F24F 13/20; F24F 13/28; F24F 2221/14; F24F 2221/26
  USPC ........................... 55/309, 312, 314, 467, 476
  See application file for complete search history.

(56) References Cited

U.S. PATENT DOCUMENTS

| | | | | |
|---|---|---|---|---|
| 7,417,553 B2* | 8/2008 | Young | ..................... | G08B 17/10 340/693.6 |
| 2001/0049927 A1* | 12/2001 | Toepel | .................. | B01D 46/88 55/385.2 |
| 2012/0071078 A1 | 3/2012 | Yang et al. | | |
| 2012/0216982 A1 | 8/2012 | Lee | | |
| 2013/0167578 A1* | 7/2013 | Ikeda | ..................... | F24F 1/0011 62/412 |
| 2023/0151982 A1* | 5/2023 | Jo | ............................ | F24F 8/10 454/187 |
| 2023/0175709 A1* | 6/2023 | Kim | ........................ | F24F 13/20 62/89 |
| 2023/0235917 A1* | 7/2023 | Cho | ........................ | F24F 13/28 454/251 |

FOREIGN PATENT DOCUMENTS

| | | | |
|---|---|---|---|
| JP | 10-024250 | | 1/1998 |
| JP | 2001095902 A | * | 4/2001 |
| JP | 2006-266664 A | | 10/2006 |
| JP | 2016-156531 A | | 9/2016 |
| KR | 20-0306504 Y1 | | 3/2003 |
| KR | 10-2007-0063993 A | | 6/2007 |
| KR | 10-0815484 B1 | | 3/2008 |
| KR | 10-2009-0043873 A | | 5/2009 |
| KR | 10-2010-0128815 A | | 12/2010 |
| KR | 10-2011-0048099 A | | 5/2011 |
| KR | 10-2017-0004468 A | | 1/2017 |
| KR | 10-2059727 B1 | | 12/2019 |

OTHER PUBLICATIONS

International Search Report issued in International Application No. PCT/KR2020/019307 dated Apr. 26, 2021.
International Written Opinion issued in International Application No. PCT/KR2020/019307 dated Apr. 26, 2021.
Office Action issued by the Korean Patent Office on Aug. 25, 2024 for Korean Patent Application No. 10-2020-0007499.

* cited by examiner

BURIED TYPE AIR PURIFIER

CROSS-REFERENCE TO RELATED APPLICATIONS

This application is a continuation application, under U.S.C. § 111(a), of International Patent Application No. PCT/KR2020/019307, filed on Dec. 29, 2020, which claims the benefit of Korean Patent Application No. 10-2020-0007499, filed on Jan. 20, 2020, in the Korean Intellectual Property Office, the entire disclosures of each of which are incorporated herein by reference as a part of this application.

BACKGROUND

Field

The disclosure relates to a buried type air purifier which has a ventilation and air purification function.

Description of Related Art

A general air purifier is a device which filters dust, bacteria or the like in air to clean the air. Recently, the general air purifier has been capable of perform two functions as a single device by having a function of ventilating indoor air as well as a basic air purification function.

A conventional air purifier includes an air blower for taking in or discharging indoor or outdoor air and a filter for filtering the air which is discharged to an indoor space while the air purification function and the ventilation function are performed. Such air purifier is installed after a buried opening is formed on a ceiling or wall. Here, the air blower requires a large-sized fan and a motor which has a sufficient output in order to generate a sufficient intake power with low noise. Accordingly, the air purifier requires large volume to be applied with a large-sized air blower.

In this regard, the air purifier of a large size causes a slim design to be difficult so that it is not good for appearance. Further, if the buried opening becomes small, an after-sales service is difficult when a part such as the fan is in a breakdown.

SUMMARY

In order to achieve the above mentioned purpose, there is provided a buried type air purifier. The buried type air purifier includes: a main body configured to be buried in a buried space through a buried opening which is provided on a boundary surface between a use space and the buried space, the main body having an intake passage and a discharge passage which take in and discharge air, respectively; a fan to guide air of the use space along the intake passage and the discharge passage; and a filter to filter the air. The main body includes: a first main body part having a fan accommodating part to accommodate the fan; and a second main body part having a cross sectional area, which is parallel with the boundary surface, being smaller than the first main body part, wherein the second main body part is formed to pass the intake passage and the discharge passage through which the air guided via the fan accommodated in the fan accommodating part passes.

The main body may include a panel coupleable to an end part of the second main body part so that while the panel is coupled to the end part of the second main body, the panel is toward the use space, and the panel has an intake opening through which air flows toward the intake passage and a discharge opening through which air flows from the discharge passage.

The panel may have an area along a direction of the boundary surface that is larger than the buried opening.

A cross sectional area of the second main body part may be smaller than the buried opening.

The first main body part may have a cross sectional area, which is parallel with the boundary surface, that is larger than the buried opening.

The second main body part may be formed to extend along a direction of a length with a width which is narrower than a width of the first main body part.

The main body may have a lateral cross section along a direction of a length to be an 'L' shape.

The filter may be provided in the intake passage.

The main body may further include a first ventilation passage through which air inflowing from outside is delivered to the fan via the filter and a second ventilation passage through which air is directly delivered to the fan.

The main body may further include a ventilation passage changing part which is controlled to open and close one of the first ventilation passage and the second ventilation passage.

The main body may further include an opening on a boundary between the first main body part and the second main body part for inserting or drawing the fan and a partition cover covering the opening.

The fan may include a bell mouth, a fan wheel, a motor cover and a motor which are separable from one another.

The motor cover may include a locking part formed to lock and release with regard to the first main body part according to a forward and reverse turn, respectively.

The main body may further include a discharge direction changing part for changing a discharge direction of the air which is discharged through the discharge opening.

DETAILED DESCRIPTION

Figure 1:
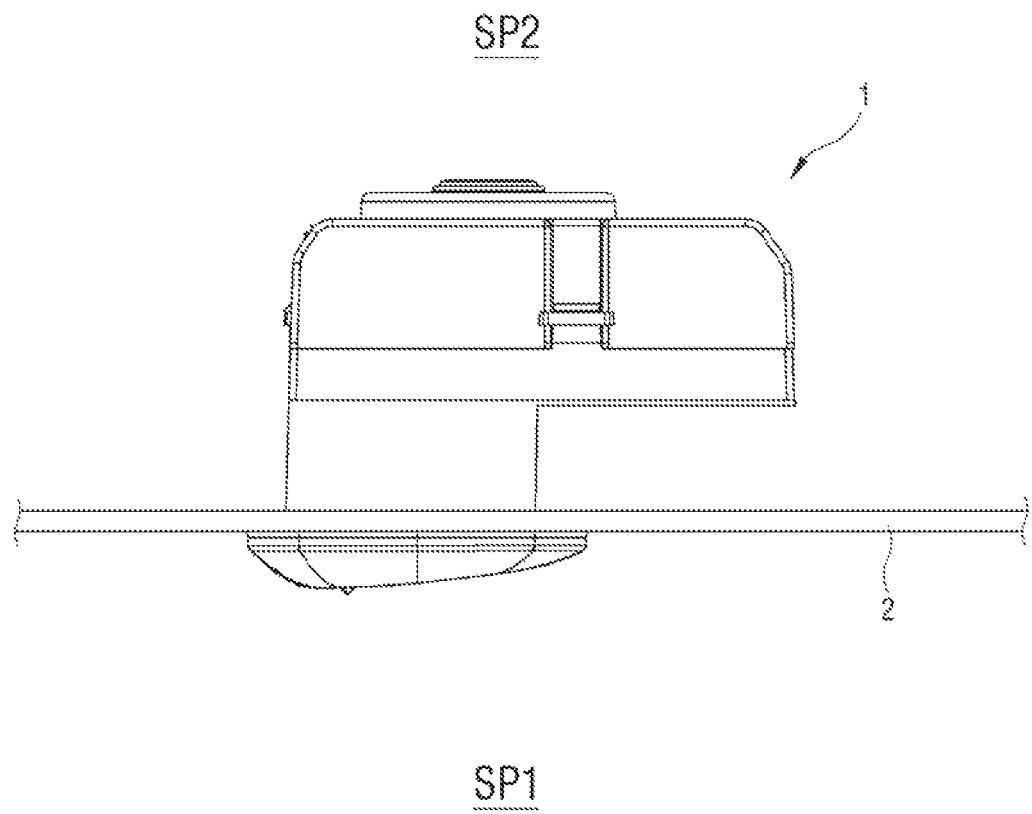
FIG. 1 is a perspective view illustrating a buried type air purifier which is buried and installed on a ceiling according to an embodiment of the disclosure.

Hereinafter, embodiments of the disclosure will be described in detail with reference to the accompanying drawings. In the drawings, the same reference numbers or signs refer to components that perform substantially the same function, and the size of each component in the drawings may be exaggerated for clarity and convenience. However, the technical idea and the core configuration and operation of the disclosure are not limited only to the configuration or operation described in the following examples. In describing the disclosure, if it is determined that a detailed description of the known technology or configuration related to the disclosure may unnecessarily obscure the subject matter of the disclosure, the detailed description thereof will be omitted.

In the disclosure, an expression "have", "may have", "include", "may include", or the like, indicates existence of a corresponding feature (for example, a numerical value, a function, an operation, a component such as a part, or the like), and does not exclude existence of an additional feature.

In the disclosure, an expression "A or B", "at least one of A and/or B", "one or more of A and/or B", or the like, may include all possible combinations of items enumerated together. For example, "A or B", "at least one of A and B", or "at least one of A or B" may indicate all of (1) a case in which at least one A is included, (2) a case in which at least one B is included, or (3) a case in which both of at least one A and at least one B are included.

In embodiments of the disclosure, terms including ordinal numbers such as first and second are used only for the purpose of distinguishing one component from other components, and singular expressions include plural expressions unless the context clearly indicates otherwise.

In addition, in the embodiment of the disclosure, terms such as 'top', 'bottom', 'left', 'right', 'inside', 'outside', 'inner surface', 'outer surface', 'front', and 'rear' are defined based on the drawings, and shapes or positions of each component are not limited thereby.

An expression "configured (or set) to" used in the disclosure may be replaced by an expression "suitable for", "having the capacity to" "designed to", "adapted to", "made to", or "capable of" depending on a situation. A term "configured (or set) to" may not necessarily mean "specifically designed to" in hardware. Instead, an expression "an apparatus configured to" may mean that the apparatus may "do" together with other apparatuses or components.

An aspect of the disclosure is to provide a buried type air purifier which is capable of allowing for installation and an after-sales service with a small buried opening and for realizing slimness.

As described above, the air purifier according to the disclosure is good for appearance because only a slim panel of the air purifier which takes in and discharges air exposes.

The air purifier according to the disclosure is capable of allowing for installation and an after-sales service even with a small-sized buried opening because the air purifier has an 'L'-shaped cross section.

An air purifier 1 according to various embodiments of the disclosure may include, as a device which maintains indoor air to be comfortable, at least one of an air purifier for household use, an air purifier for industrial use, a system air purifier, an air cleaner, an air conditioner for household use, an air conditioner for industrial use and a ventilator.

Figure 2:
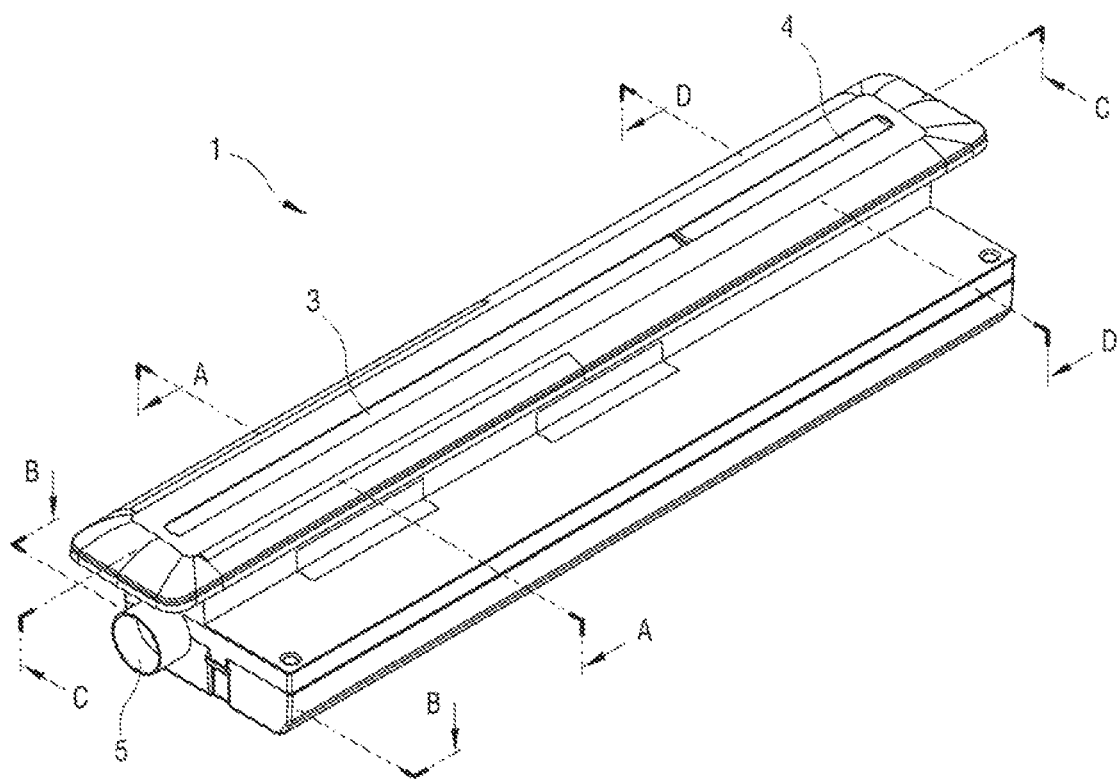
FIG. 2 is a perspective view illustrating the air purifier shown in FIG. 1 according to an embodiment of the disclosure.

FIG. 1 is a perspective view illustrating a buried type air purifier 1 which is buried and installed on a ceiling according to a first embodiment of the disclosure, and FIG. 2 is a perspective view illustrating the air purifier 1 shown in FIG. 1.

Referring to FIG. 1, the air purifier 1 may be buried on a boundary surface 2 between a use space SP1 and a buried space SP2, for example, inside a ceiling or wall.

Referring to FIG. 2, the air purifier 1 may include an intake opening 3 which takes in air from the use space SP1, a discharge opening 4 which discharges air to the use space SP1 and a ventilation opening 5 which takes in air from outside.

Figure 3:
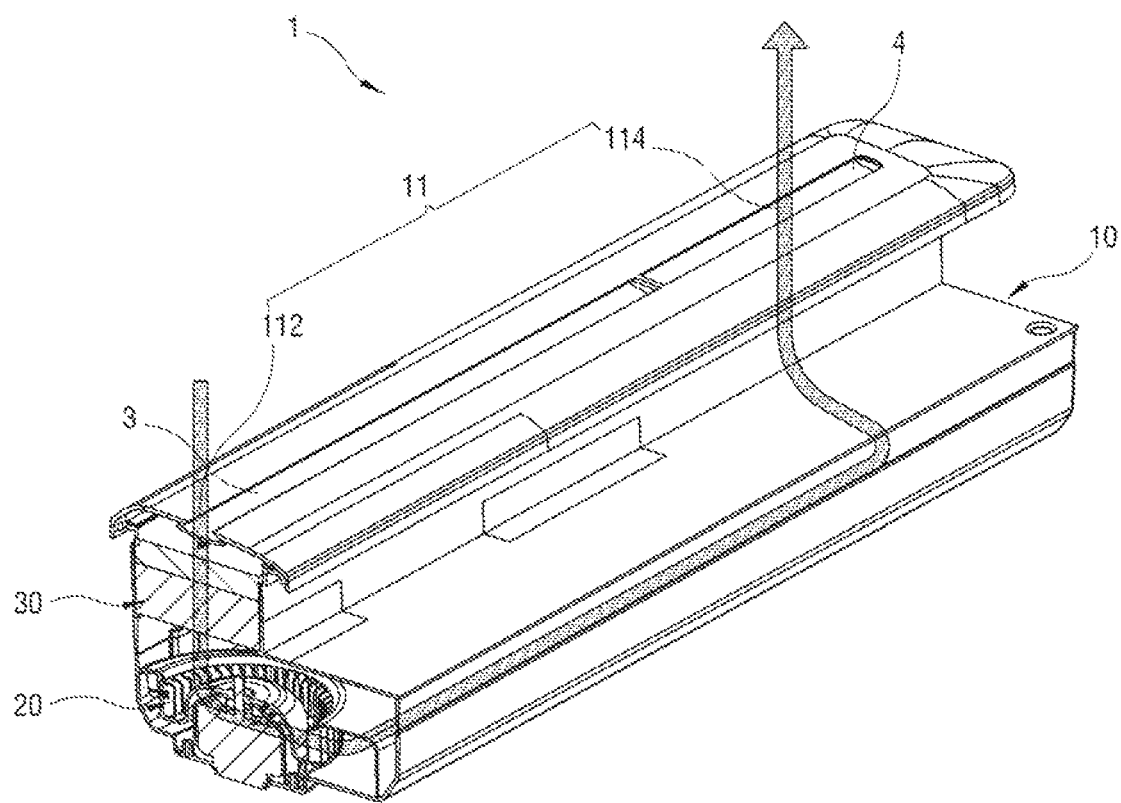
FIG. 3 is a perspective view illustrating a cross section of the air purifier which is cut along an A-A line shown in FIG. 2 according to an embodiment of the disclosure.
Figure 4:
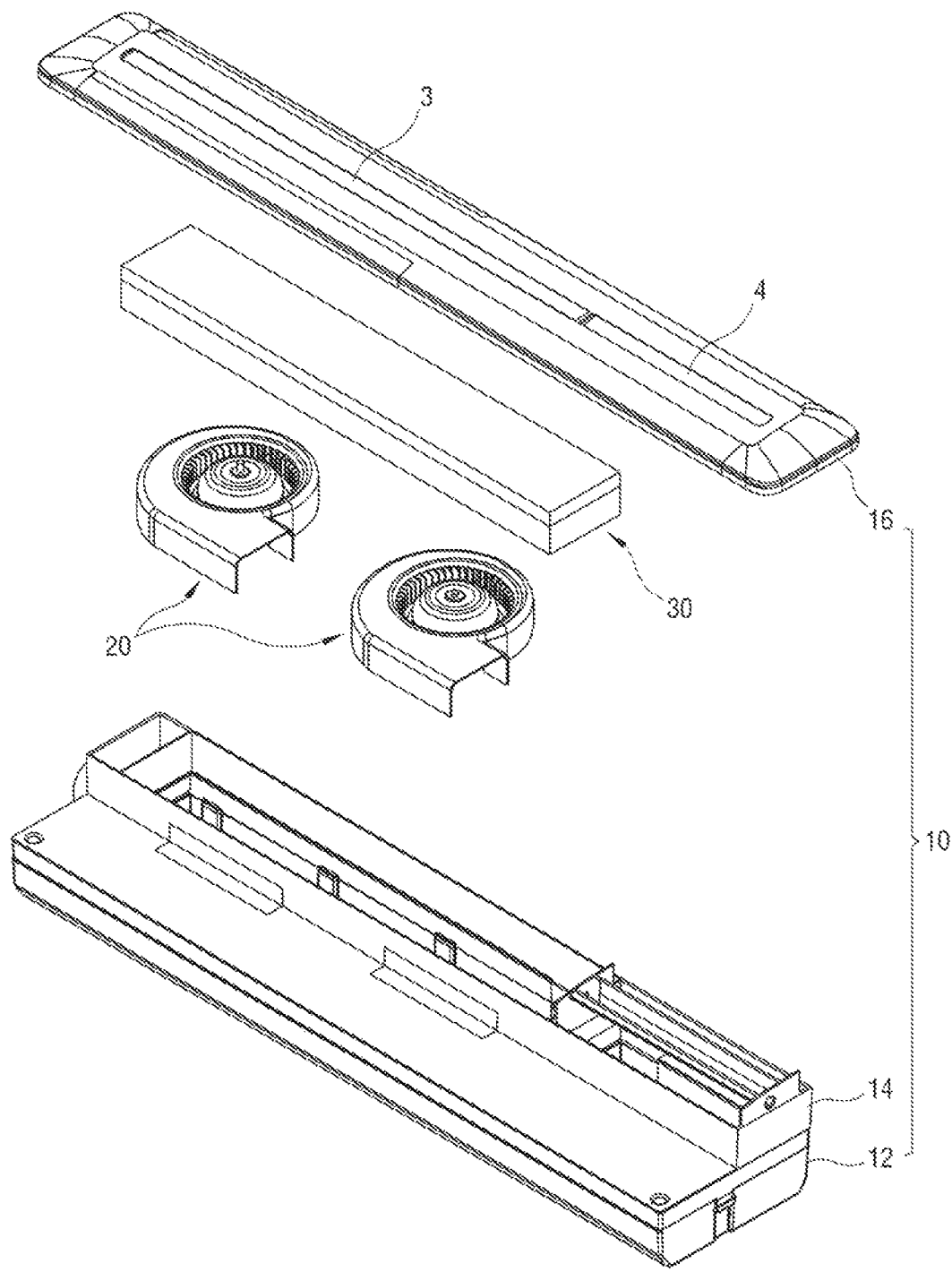
FIG. 4 is an exploded perspective view illustrating the air purifier shown in FIG. 2 according to an embodiment of the disclosure.

FIG. 3 is a perspective view illustrating a cross section of the air purifier 1 which is cut along an A-A line shown in FIG. 2, and FIG. 4 is an exploded perspective view illustrating the air purifier 1 shown in FIG. 2.

Referring to FIGS. 3 and 4, the air purifier 1 may include a main body 10, a fan 20 and a filter 30 which filters air.

The main body 10 may include a first main body part 12 having a rectangular box shape, a second main body part 14 having a rectangular box shape and extending integrally with the first main body part 12 and a panel 16 coupled to an end part of the second main body part 14.

The main body 10 may include a passage 11 which is connected via an intake opening 3, a filter 30, a fan 20 and a discharge opening 4. The passage 11 may include an intake passage 112 which is connected to the intake opening 3, the filter 30 and the fan 20 and a discharge passage 114 which is connected to the fan 20 and the discharge opening 4.

In the intake passage 112 may be filled with the filter 30 which filters air that is taken in. Also, the filter 30 may be disposed in the discharge passage 114 instead of the intake passage 112 or be installed both in the intake passage 112 and the discharge passage 114.

The fan 20 may take in air from the intake passage 112 or from outside and discharge to the discharge opening 4 through the discharge passage 114.

The filter 30 is installed in the main body 10 and may filter air which is taken in by the fan 20.

The filter 30 may include, according to a filtering type, a free filter as a first stage filter which removes dust, dirt, pet hair, etc. that have a relatively large size, a deodorizing filer which removes a toxic substance such as smells, a volatile organic compound, formaldehyde, etc., a high efficiency particulate air (HEPA) filter which removes fine dust, tobacco smoke, bacteria, fungus, pollen, etc., a functional filter which is for protecting the HEPA filter or the like.

The filter 30 may be embodied in an electric dust collection type using an electric discharge theory or in a high pressure sterilization type in which the filter 30 purifies or sterilizes a polluted substance such as bacteria, fungus, etc. by generating positive and negative ions with a plasma discharge using a high voltage generator.

The filter 30 may combine the filtering type, the electric dust collection type or the high pressure sterilization type.

Figure 5:
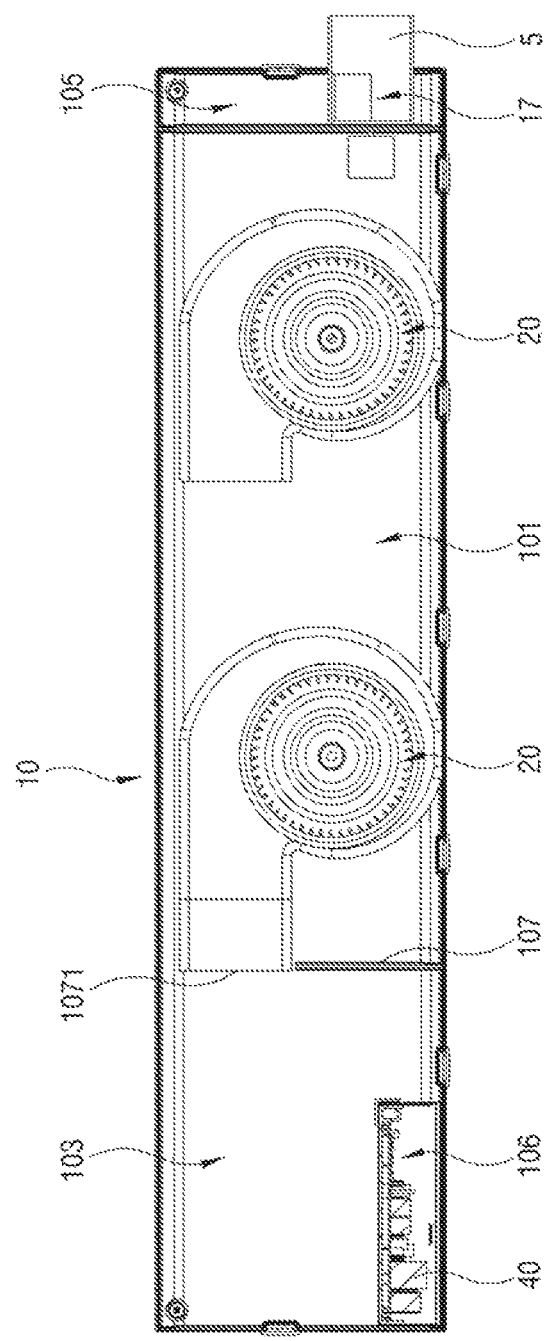
FIG. 5 is a cross sectional view illustrated according to a B-B line shown in FIG. 2 according to an embodiment of the disclosure.
Figure 6:
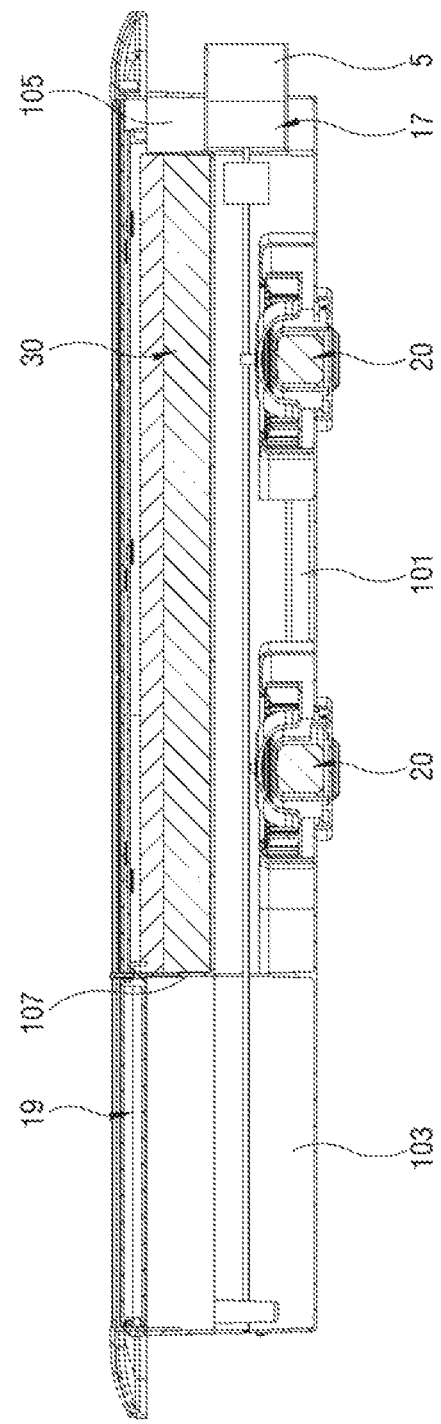
FIG. 6 is a cross sectional view illustrated according to a C-C line shown in FIG. 2 according to an embodiment of the disclosure.

FIG. 5 is a cross sectional view illustrated according to a B-B line shown in FIG. 2 and FIG. 6 is a cross sectional view illustrated according to a C-C line shown in FIG. 2.

The main body 10 may include an intake space part 101, a discharge space part 103, a ventilation space part 105 and a module installation part 106. The intake space part 101 and the discharge space part 103 may be divided by a partition 107. The partition 107 may be provided with a passage 1071 to allow the intake space part 101 and the discharge space part 103 to communicate with each other.

The intake space part 101 may be installed with a fan 20 and a filter 30.

The discharge space part 103 may be provided with a discharge direction changing part 19.

The ventilation space part 105 may be provided with a ventilation opening 5 and a ventilation passage changing part 17.

The module installation part 106 may be installed with a driving circuit module 40.

Figure 7:
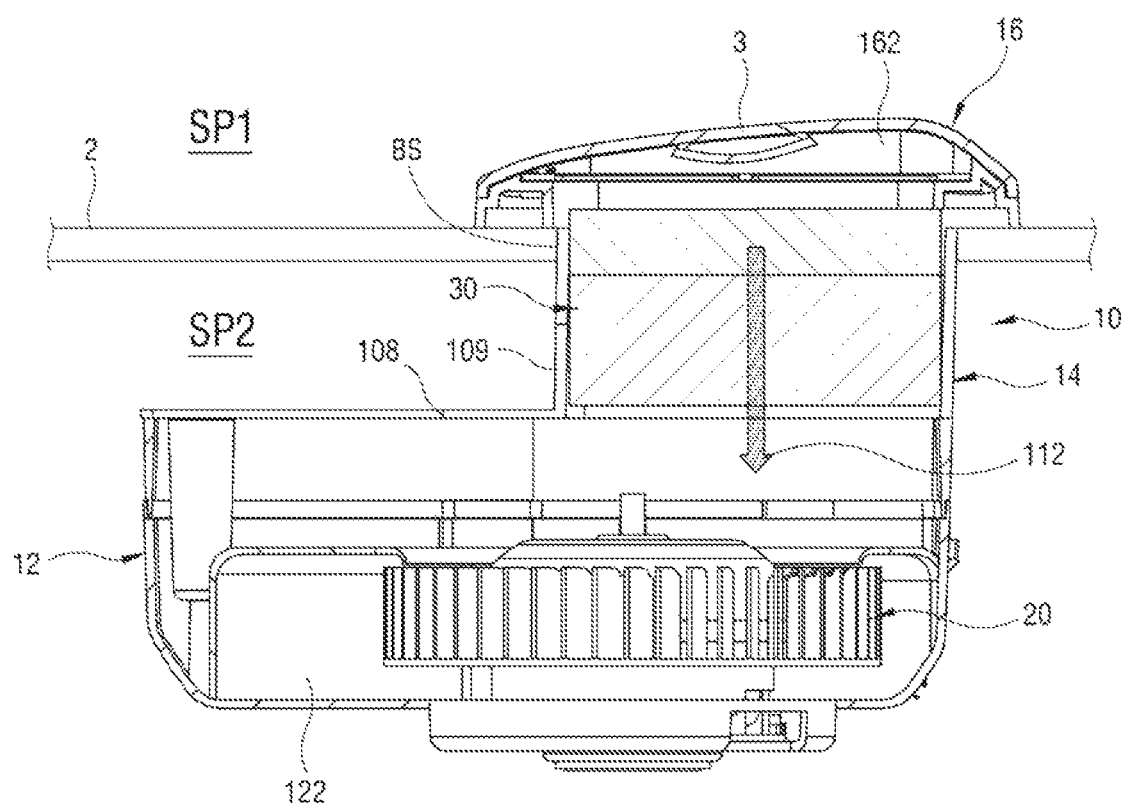
FIG. 7 illustrates a cross sectional view which is cut along an A-A line shown in FIG. 2 according to an embodiment of the disclosure.
Figure 8:
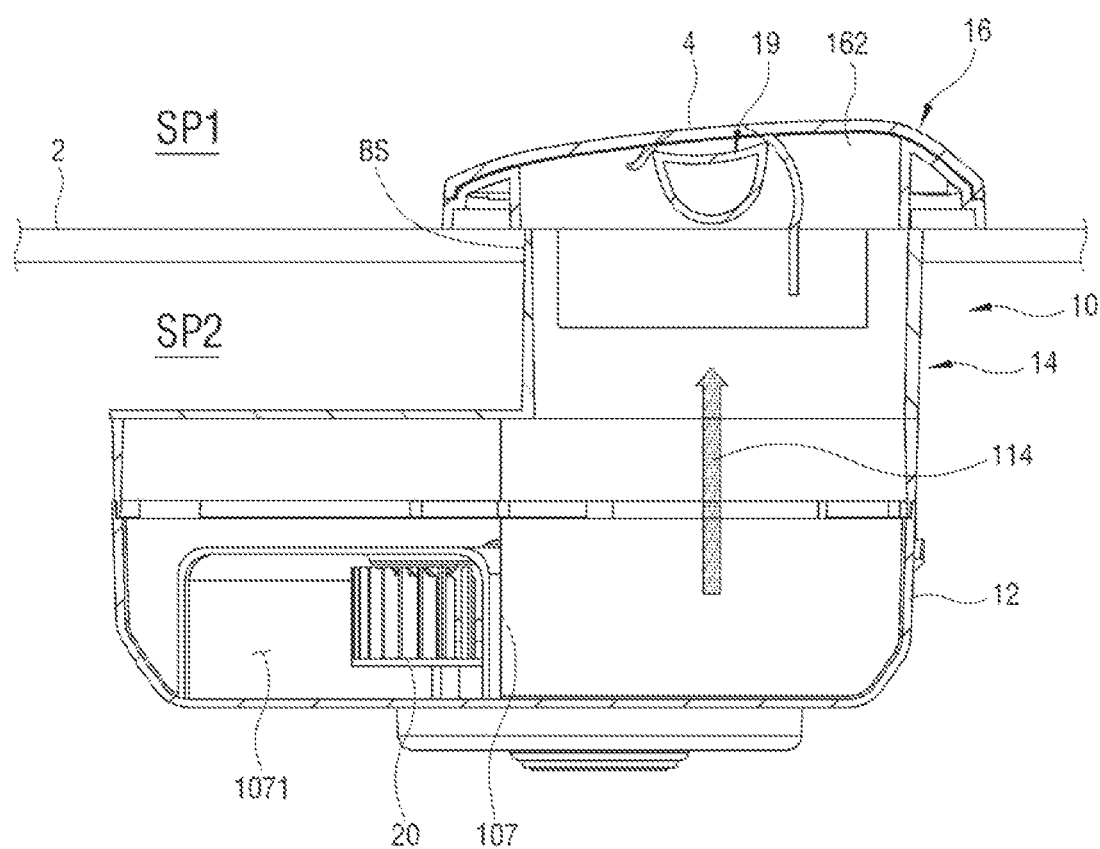
FIG. 8 illustrates a cross sectional view which is cut along a D-D line shown in FIG. 2 according to an embodiment of the disclosure.
Figure 9:
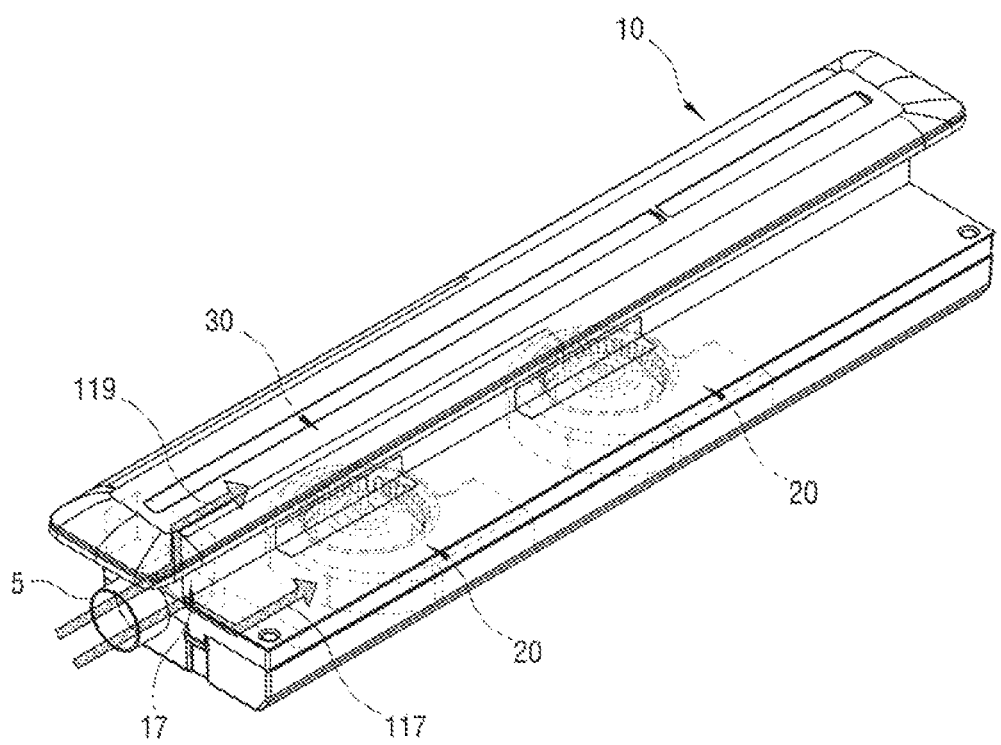
FIG. 9 illustrates a ventilation passage according to an embodiment of the disclosure.

FIG. 7 illustrates a cross sectional view which is cut along a A-A line shown in FIG. 2, FIG. 8 illustrates a cross sectional view which is cut along a D-D line shown in FIG. 2 and FIG. 9 illustrates a ventilation passage 116.

As illustrated in FIGS. 7 and 8, the main body 10 may have, for example, an "L"-shaped cross section. When buried in a buried space SP2, the main body 10 may be turned and pushed in after an end part of the "L"-shaped cross section is inserted into a buried opening BS. Consequently, the main body 10 may be easily buried through the buried opening BS having a small area.

The main body 10 may include a first main body part 12 which has a fan accommodating part 122 for accommodating the fan 20, a second main body part 14 for accommodating the filter 30 and a panel 16 which is coupled to the second main body part 14.

The first main body part 12 may be installed with one or more fans 20 on a bottom. The first main body part 12 may have a fan accommodating part 122 with an appropriate size to accommodate the fan 20.

The first main body part 12 may be coupled with the second main body part 14 in a single body along a direction of a length at one side. Also, the first main body part 12 and the second main body part 14 may be produced separately and assembled.

The first main body part 12 may be formed to have a cross sectional area in a direction parallel with a boundary surface 2 to be larger than the buried opening BS.

The second main body part 14 may extend from the first main body part 12 to the panel 16 which is exposed to the use space SP1. That is, the second main body part 14 may extend along the direction of the length of the first main body part 12 with a width which is narrower than the first main body part 12.

The main body 10 may be formed with an opening 108 at a boundary portion between the first main body part 12 in which the fan 20 is installed and the second main body part 14. The opening 108 is a space to draw or insert disassembled parts of the fan 20 for replacement during a breakdown. The opening 108 may be blocked by a separable partition cover 109.

The second main body part 14 may be formed to have a cross sectional area parallel with the boundary surface 2 to be smaller than the first main body part 12.

The second main body part 14 may be formed to have a cross sectional area parallel with the boundary surface 2 to be smaller than the buried opening BS.

The panel 16 may be coupled to an end part of the second main body part 14 towards the use space SP1, and include an intake opening 3 which communicates with the intake passage 112 and a discharge opening 4 which communicates with the discharge passage 114.

The panel 16 may include a dent part 162 inside facing the second main body part 14. The dent part 162 at the intake opening 3 may provide a room for allowing air which inflows through the intake opening 3 to be delivered to the filter 30. Also, the dent part 162 at the discharge opening 4 may provide an operation space for allowing the discharge direction changing part 19 to operate.

The panel 16 may be formed to have an area in a boundary surface direction to be larger than the buried opening BS so that the buried opening BS is not seen in the use space SP1. Consequently, the air purifier 1 is good for appearance when installed, because most of the main body 10 is buried in the buried space SP2 and only the panel 16, having a slim structure which is narrower than the first main body part and is thinner than the second main body part 14, is exposed to the use space SP1.

In another embodiment, the main body 10 may be formed to be a "T"-shape instead of the "L"-shape.

Referring to FIG. 9, the main body 10 may include the ventilation passage changing part 17 which is controlled to select a progress direction of air that inflows through the ventilation opening 5, that is, a first ventilation passage 117 directly towards the fan 20 or a second ventilation passage 119 via the filter 30.

Figure 10:
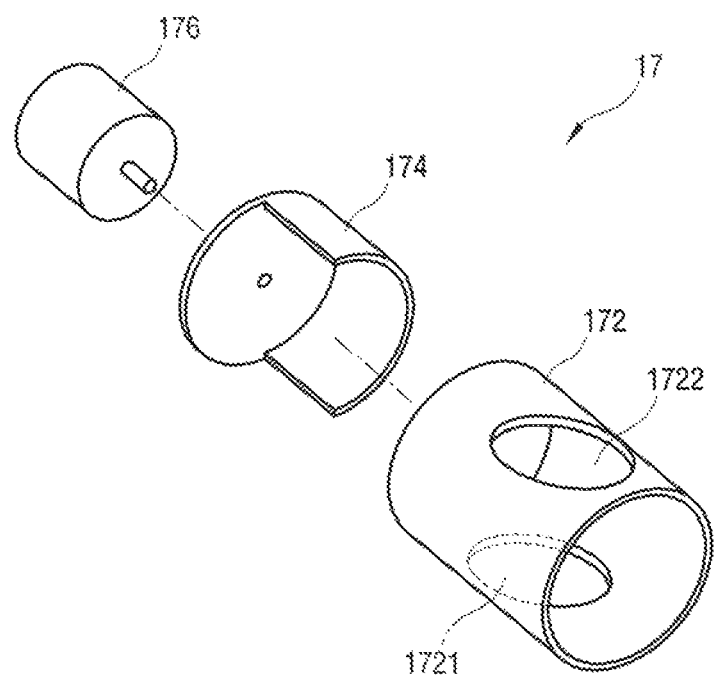
FIG. 10 is an exploded view illustrating a ventilation passage changing part according to an embodiment of the disclosure.
Figure 11:
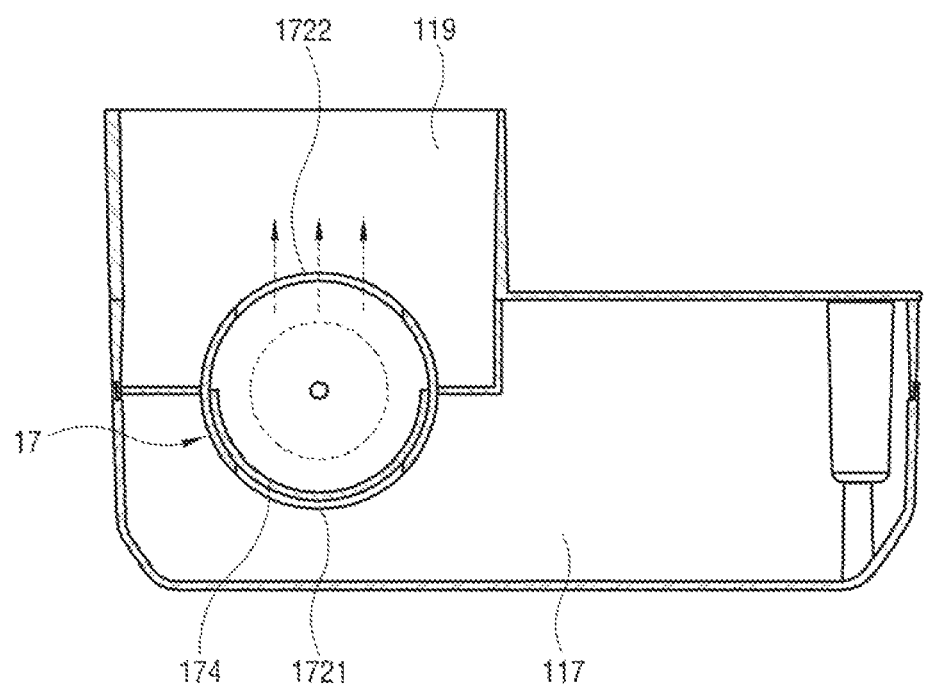
FIG. 11 illustrates the ventilation passage changing part with a second ventilation passage being opened according to an embodiment of the disclosure.
Figure 12:
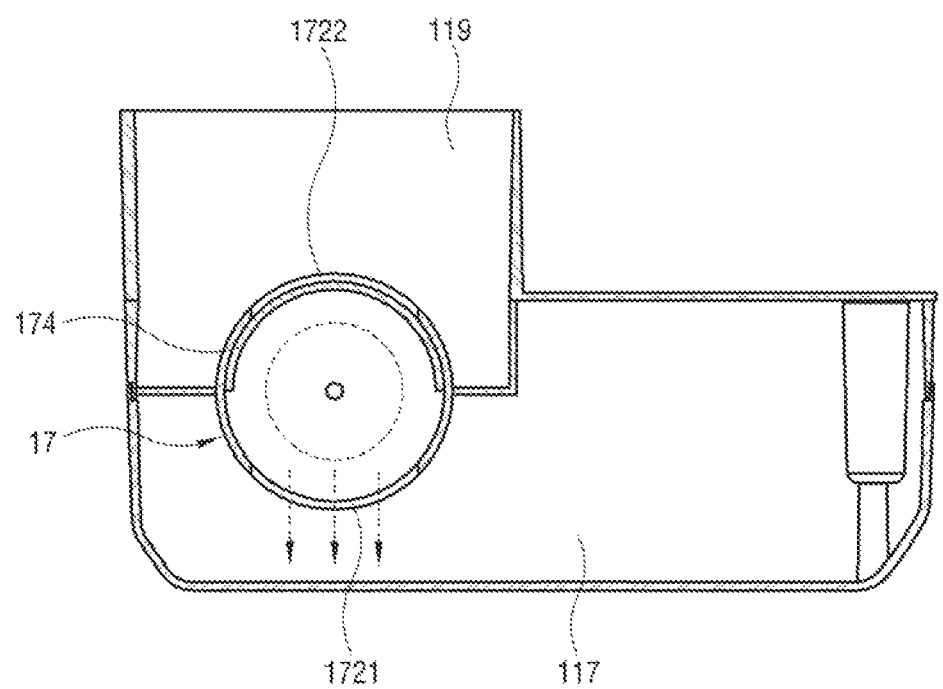
FIG. 12 illustrates the ventilation passage changing part with a first ventilation passage being opened according to an embodiment of the disclosure.

FIG. 10 is an exploded view illustrating the ventilation passage changing part 17, FIG. 11 illustrates the ventilation passage changing part 17 with the second ventilation passage 119 being opened, and FIG. 12 illustrates the ventilation passage changing part 17 with the first ventilation passage 117 being opened.

Referring to FIG. 10, the ventilation passage changing part 17 may include a ventilation inflow pipe 172 of a cylindrical pipe shape, a first shutter part 174 of a semi cylindrical shape which has an outer diameter corresponding to an inner diameter of the ventilation inflow pipe 172 and a first motor 176 which allows the first shutter part 174 to operate.

The ventilation inflow pipe 172 may have a first opening 1721 which communicates with the first ventilation passage 117 and a second opening 1722 which communicates with the second ventilation passage 119.

The first shutter part 174 may selectively close or open the first opening 1721 and the second opening 1722 by rotating with the ventilation inflow pipe 172 in which the first shutter part 174 is inserted.

The first motor 176 may rotate the first shutter part 174 in a circumferential direction by 180 degrees clockwise or counterclockwise.

Referring to FIGS. 11 and 12, the ventilation inflow pipe 172 may be provided at a boundary between the first ventilation passage 117 and the second ventilation passage 119.

If the air that is supplied from outside has a bad quality, as illustrated in FIG. 11, the second opening 1722 may be opened to supply the air to the fan 20 through the second ventilation passage 119 via the filter 30. On the other hand, if the air supplied from outside has a good quality, as illustrated in FIG. 12, the first opening 1721 may be opened to supply the air directly to the fan 20 through the first ventilation passage 117.

Figure 13:
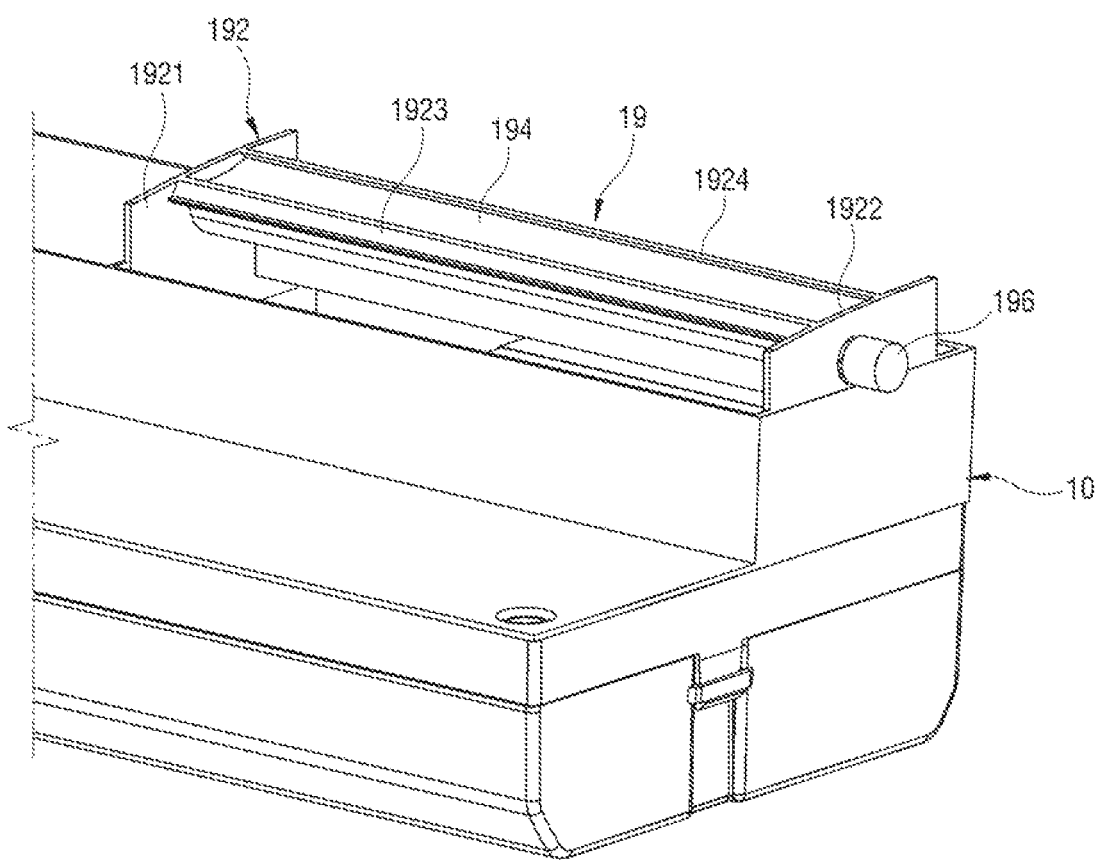
FIG. 13 illustrates a discharge direction changing part according to an embodiment of the disclosure.
Figure 14:
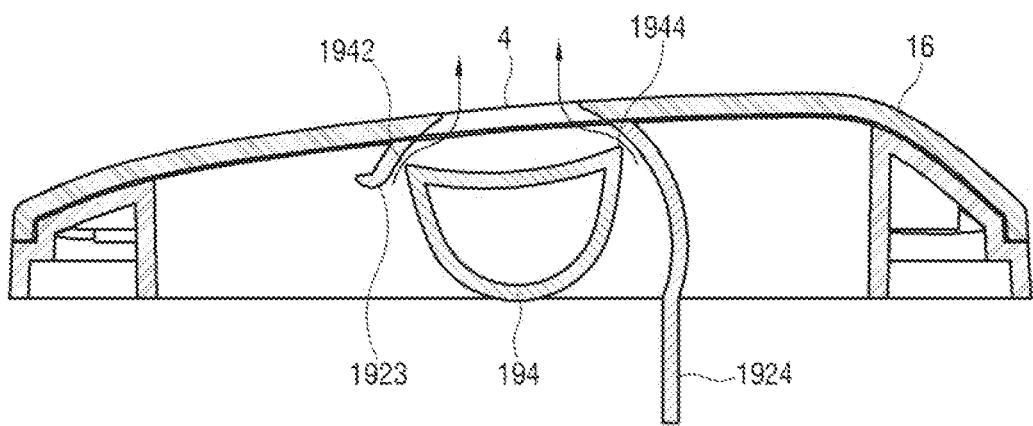
FIG. 14 illustrates the discharge direction changing part in a discharge state of a normal direction according to an embodiment of the disclosure.
Figure 15:
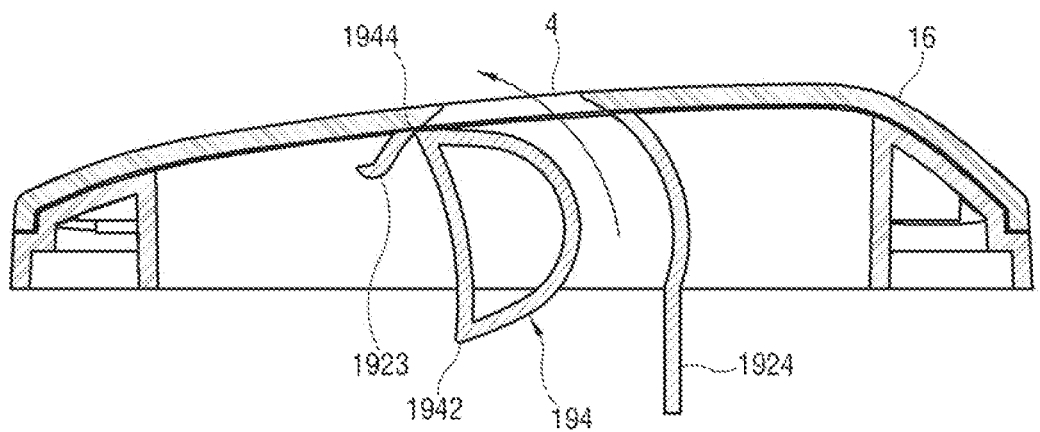
FIG. 15 illustrates the discharge direction changing part in a discharge state of a left direction according to an embodiment of the disclosure.
Figure 16:
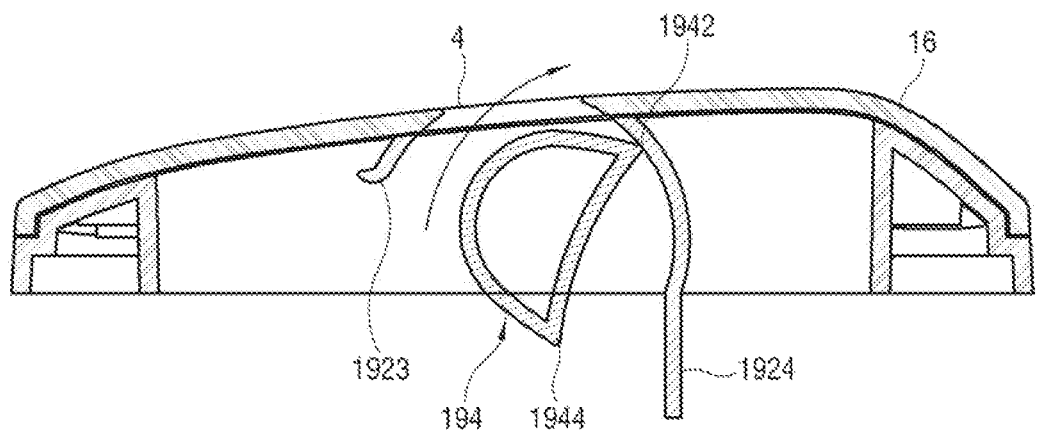
FIG. 16 illustrates the discharge direction changing part in a discharge state of a right direction according to an embodiment of the disclosure.

FIG. 13 illustrates the discharge direction changing part 19, FIG. 14 illustrates the discharge direction changing part 19 in a discharge state of a first direction, FIG. 15 illustrates the discharge direction changing part 19 in a discharge state of a second direction and FIG. 16 illustrates the discharge direction changing part 19 in a discharge state of a third direction.

Referring to FIG. 13, the discharge direction changing part 19 may include a shutter supporting part 192, a second shutter part 194 and a second motor 196 which rotates the second shutter part 194 at a predefined angle.

The shutter supporting part 192 may include a pair of plate-shaped members 1921 and 1922 which are placed at a distance from each other and first and second connecting frames 1923 and 1924 which are provided parallel with each other to couple the pair of plate-shaped members 1921 and 1922. The second connecting frame 1924 may be formed to extend downwards longer than the first connecting frame 1923 so as to guide the air to flow to the discharge opening 4 along the intake passage 112 of the passage 11 as illustrated in FIG. 8.

The second shutter part 194 may be rotatably coupled to the pair of plate-shaped members 1921 and 1922. The second shutter part 194 may have a cross section of a semi cylinder or the like and be placed between the first and second connecting frames 1923 and 1924. Consequently, the air may be discharged through a gap between the second shutter part 194 and the first connecting frame 1923 or the second connecting frame 1924. As the second shutter part 194 rotates at a predefined angle, the gap is provided at one or all of the first and second connecting frames 1923 and 1924 so that the air may be discharged.

Referring to FIG. 14, the second shutter part 194 allows a flat portion to face upwards and first and second edges 1942 and 1944 in a direction of the length of the second shutter part 194 to be distanced from the first and second connecting frames 1923 and 1924, respectively, so that the air may be discharged in the first direction.

Referring to FIG. 15, the second shutter part 194 allows the second edge 1944 in the direction of the length of the second shutter part 194 to face and be in contact with the first connecting frame 1923 so that the air may be discharged in the second direction.

Referring to FIG. 16, the second shutter part 194 allows the first edge 1942 in the direction of the length of the second shutter part 194 to face and be in contact with the second connecting frame 1924 so that the air may be discharged in the third direction.

Figure 17:
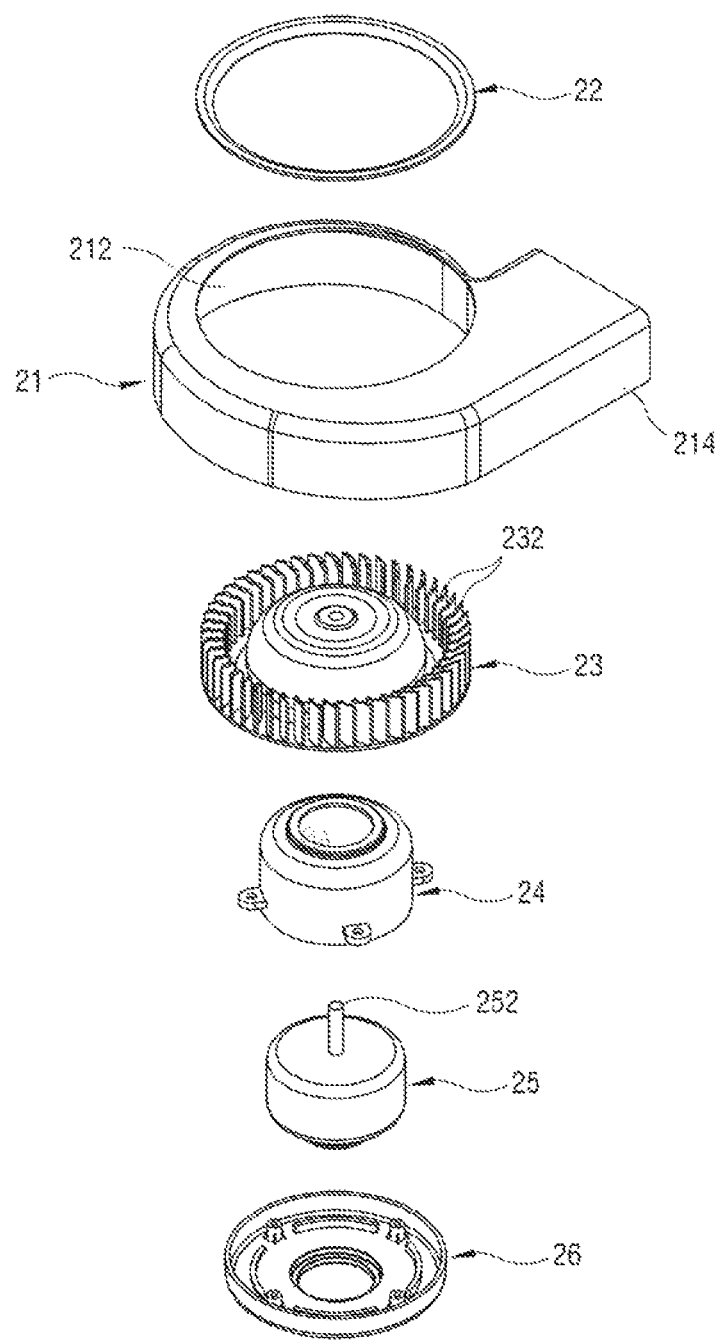
FIG. 17 is an exploded view illustrating a fan and FIG. 18 illustrates a structure in which a fan motor is fixed according to an embodiment of the disclosure.
Figure 18:
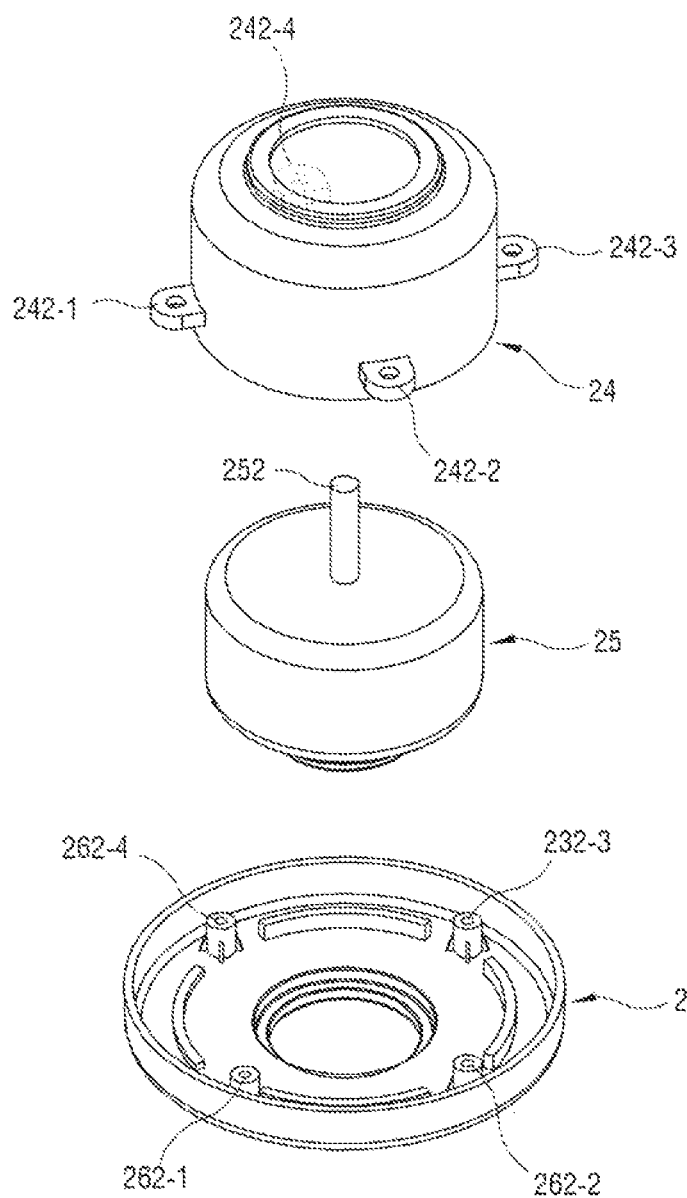
Figure 19:
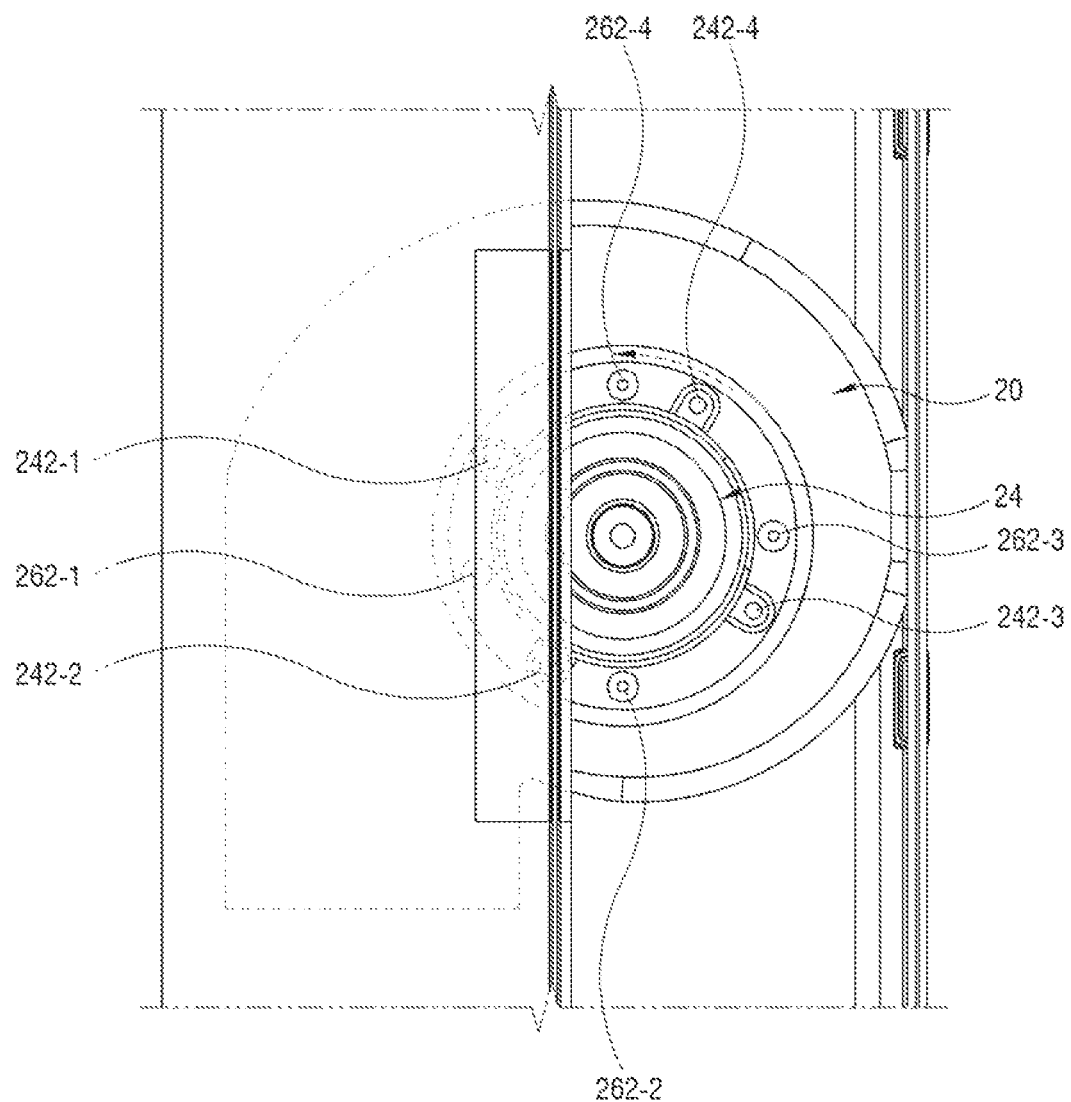
FIG. 19 illustrates a motor cover before the motor cover is coupled to a motor mounting part according to an embodiment of the disclosure.
Figure 20:
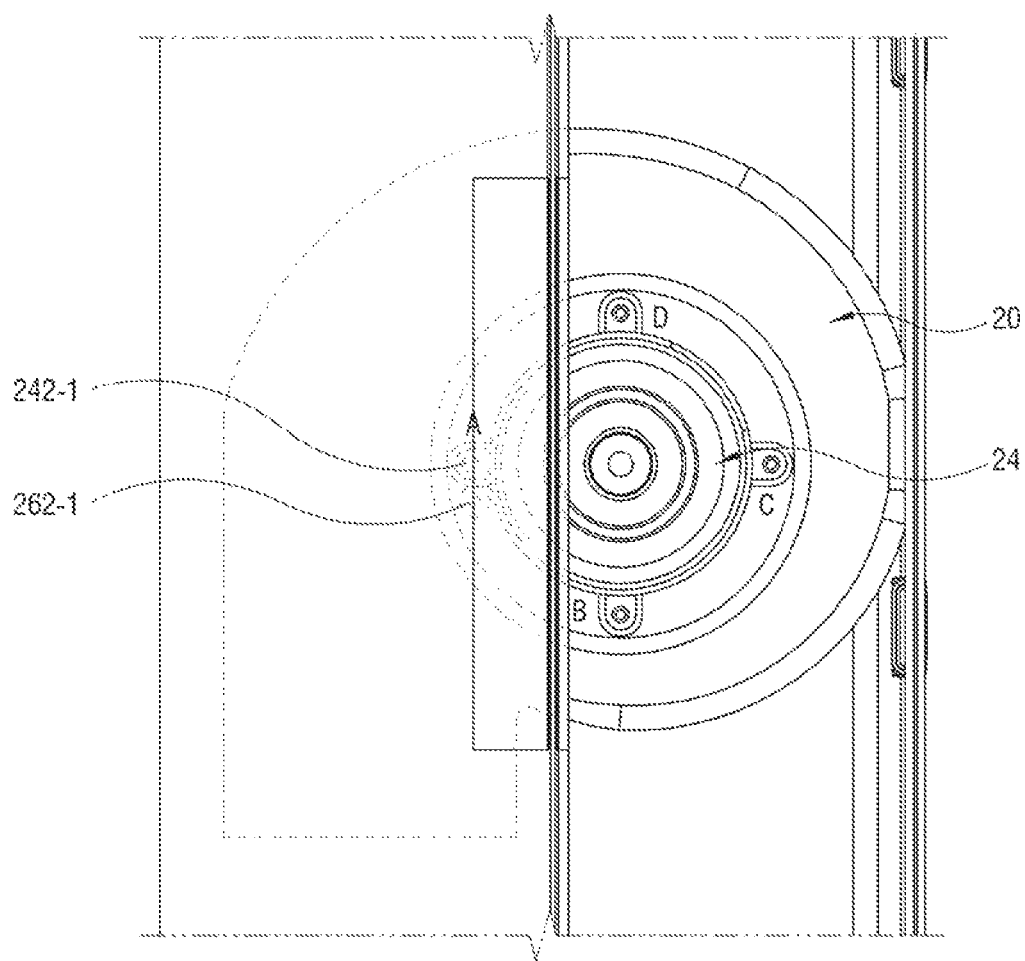
FIG. 20 illustrates the motor cover after the motor cover is coupled to the motor mounting part according to an embodiment of the disclosure.

FIG. 17 is an exploded view illustrating the fan 20, FIG. 18 illustrates a structure in which a fan motor 25 is fixed, FIG. 19 illustrates a motor cover 24 before the motor cover 24 is coupled to a motor mounting part 26 and FIG. 20 illustrates the motor cover 24 after the motor cover 24 is coupled to the motor mounting part 26.

Referring to FIG. 17, the fan 20 may include a fan case 21, a bell mouth 22, a fan wheel 23, a motor cover 24, a fan motor 25 and a motor mounting part 26. The fan case 21, the bell mouth 22, the fan wheel 23, the motor cover 24 and the fan motor 25 may be individually separated from or coupled to each other.

The fan case 21 may have a snail shape and provide an air intake opening 212 of a circular shape at a center and an air discharge opening 214 which discharges air to a side in a circumferentially tangential direction. The fan case 21 may be assembled by inserting the bell mouth 22, the fan wheel 23, the motor cover 24 and the fan motor 25 to the air intake opening 212 of the center in a reverse order.

The bell mouth 22 may be provided to be separated from the air intake opening 212 in order to enhance an intake efficiency of the air.

The fan wheel 23 may include a plurality of wings 232 which is formed along a circumferential direction. The fan wheel 23 may be installed to be fixed to a rotation axis 252 of the fan motor 25.

The motor cover 24 may have a cylindrical shape and be installed to be fixed to the motor mounting part 26 with the fan motor 25 being accommodated.

The fan motor 25 may rotate the fan wheel 23.

The motor mounting part 26 may be produced separately and coupled to a bottom of the first main body part 12. Also, the motor mounting part 26 may be formed on the bottom of the first main body part 12 in a single body.

Referring to FIG. 18, the motor cover 24 may include a locking part which fixes or separates the fan motor 25 to or from the main body 10. The locking part may include a locking rib 242-1 and first to third bolt coupling ribs 242-2 to 242-4 which protrude from an outer circumferential surface of the motor cover 24 in a radius direction, and a locking protrusion 262-1 and first to third bolt coupling parts 262-2 to 262-4 which protrude upwards from the bottom of the motor mounting part 26. The locking protrusion 262-1 may be formed to be higher than the first to third bolt coupling parts 262-2 to 262-4. Also, the locking protrusion 262-1 may be provided to be closer to the first bolt coupling part 262-2 than the third bolt coupling part 262-4. Consequently, as the motor cover 24 is set down on the motor mounting part 26 and turns, the locking rib 242-1 is blocked by the locking protrusion 262-1 and is not allowed to turn so that the first to third bolt coupling ribs 242-2 to 242-4 are placed over the first to third bolt coupling parts 262-2 to 262-4. In this way, the first to third bolt coupling ribs 242-2 to 242-4 and the first to third bolt coupling parts 262-2 to 262-4 which are coincident with each other may be coupled by screws.

Referring to FIG. 19, before fixed the motor cover 24 may turn in a counterclockwise direction. At this time, the locking rib 242-1 is in a state previous to when the locking rib 242-1 is blocked by the locking protrusion 262-1.

As the motor cover 24 shown in FIG. 19 is turned in the counterclockwise direction, like FIG. 20, the locking rib 242-1 is blocked by the locking protrusion 262-1 at a position A and is not allowed to turn any more. At this time, at three positions B, C and D may be overlapped and coupled with each other by screws the first to third bolt coupling ribs 242-2 to 242-4 and the first to third bolt coupling parts 262-2 to 262-4.

Figure 21:
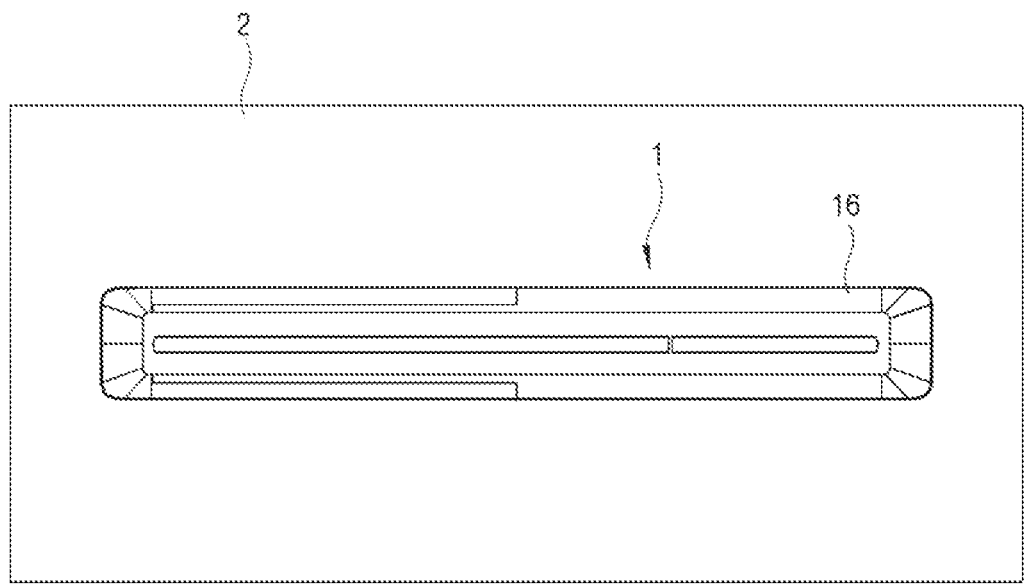
FIG. 21 illustrates the air purifier being buried and installed in a ceiling according to an embodiment of the disclosure.
Figure 22:
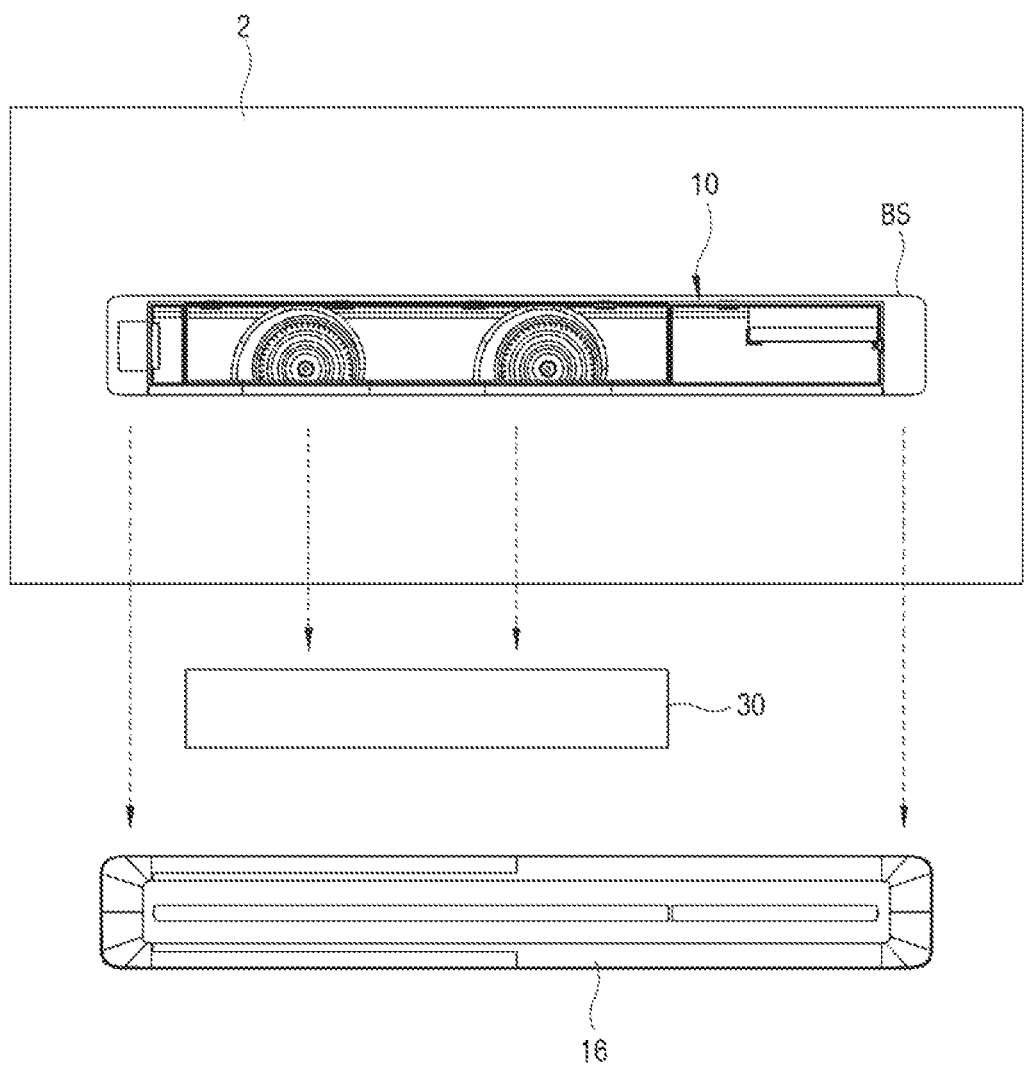
FIG. 22 illustrates the air purifier from which the panel is removed according to an embodiment of the disclosure.
Figure 23:
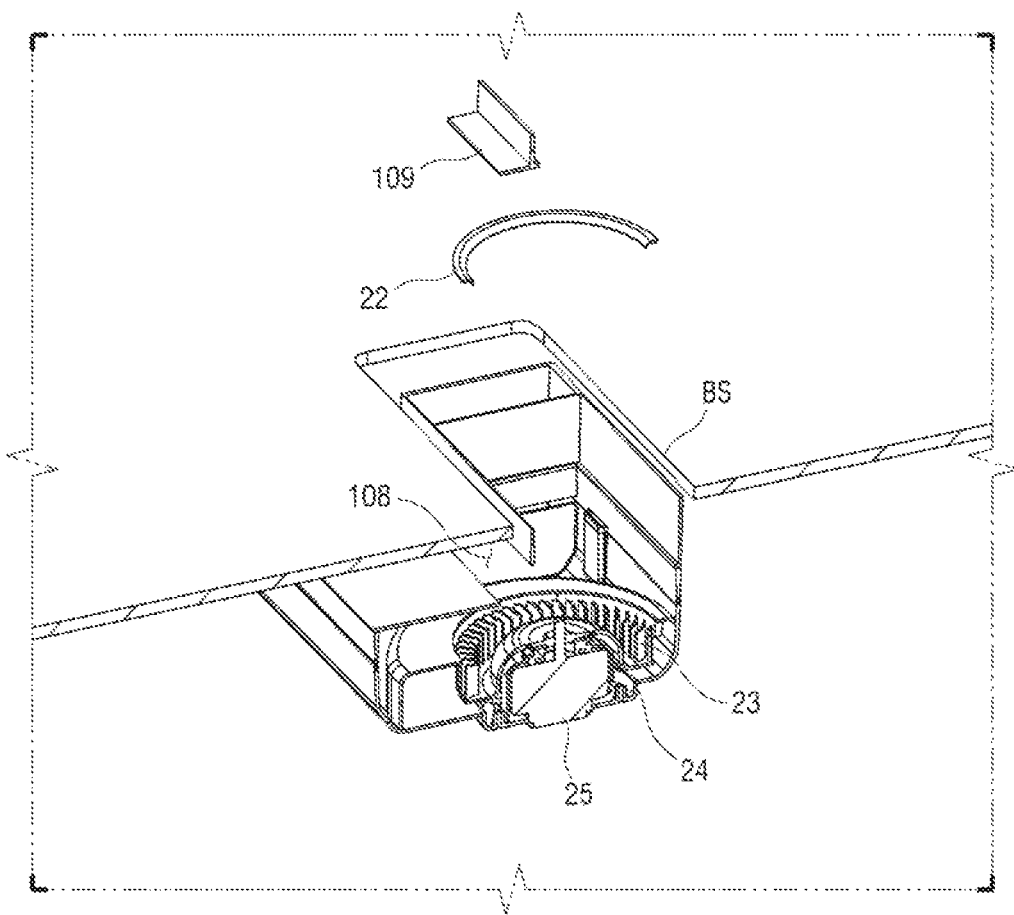
FIG. 23 illustrates a state in which a partition cover and a bell mouth are removed according to an embodiment of the disclosure.
Figure 24:
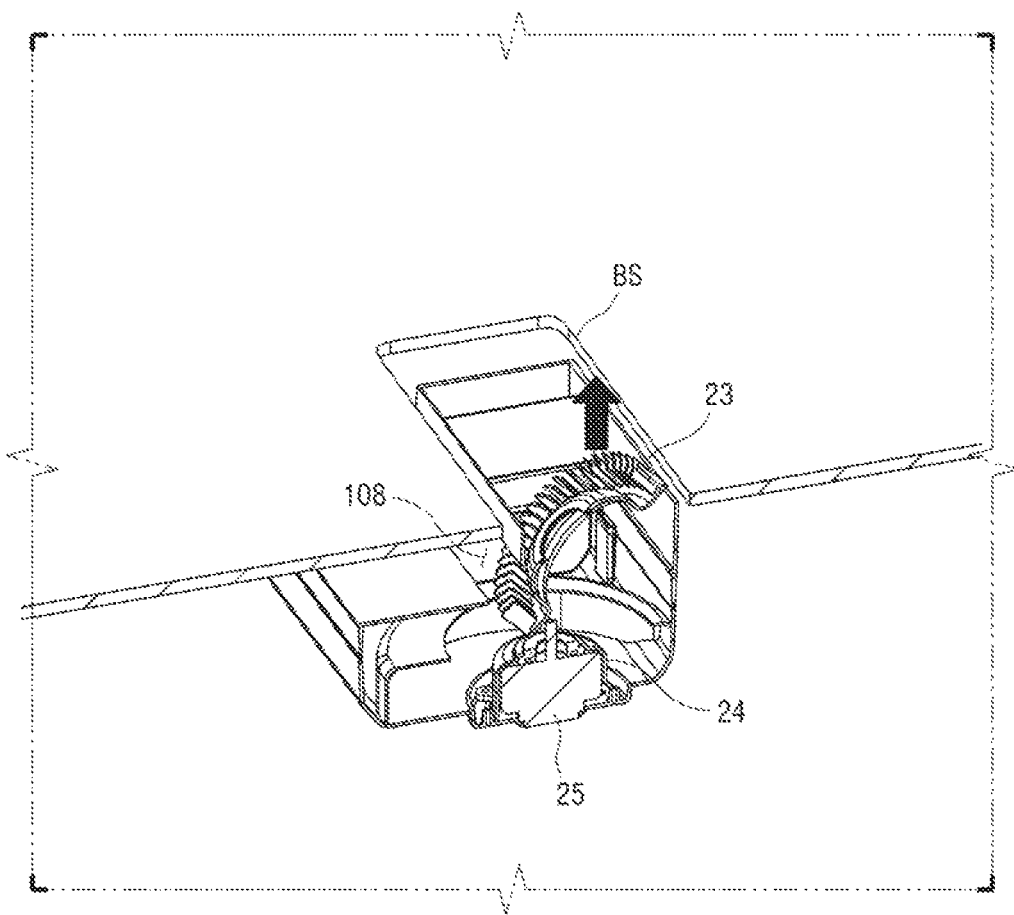
FIG. 24 illustrates a state in which the fan wheel is removed according to an embodiment of the disclosure.
Figure 25:
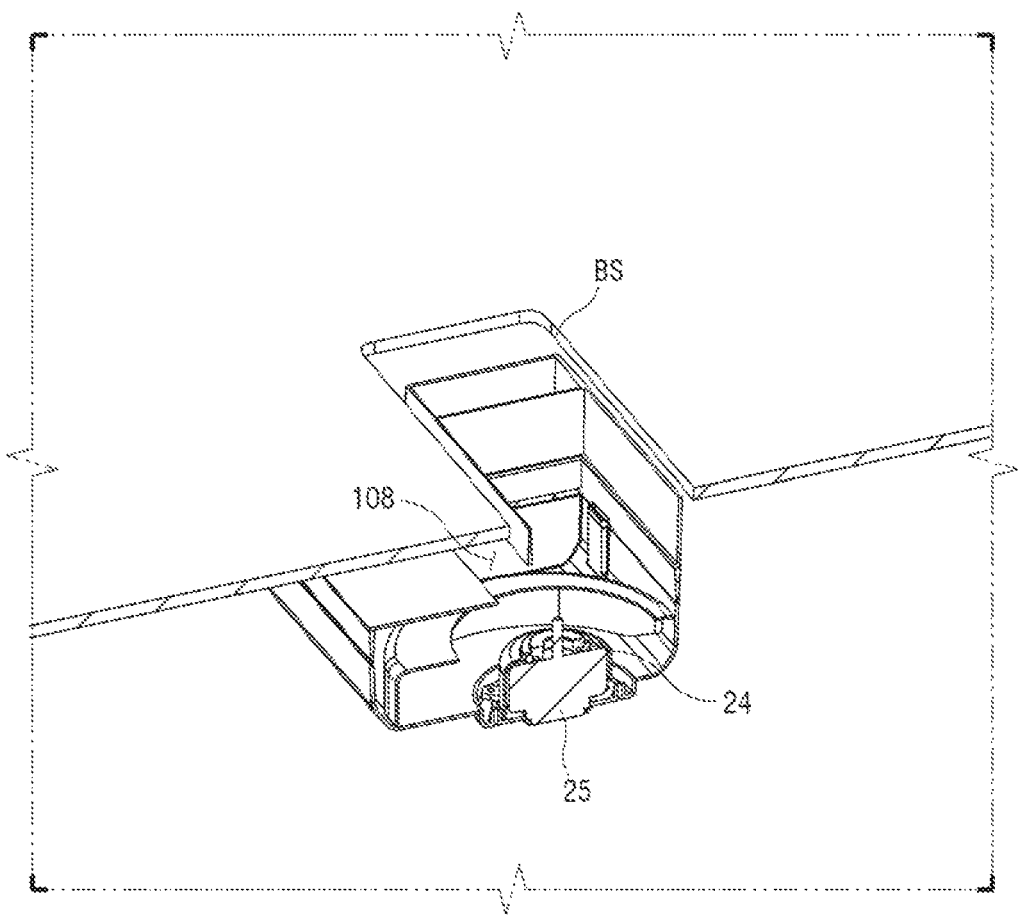
FIG. 25 illustrates a state in which the motor cover is removed according to an embodiment of the disclosure.

FIG. 21 illustrates the air purifier 1 being buried and installed in a ceiling, FIG. 22 illustrates the air purifier 1 from which the panel is removed, FIG. 23 illustrates a state in which the partition cover and the bell mouth are removed, FIG. 24 illustrates a state in which the fan wheel is removed, and FIG. 25 illustrates a state in which the motor cover 24 is removed.

Referring to FIG. 21, the air purifier 1 according to an embodiment of the disclosure may expose only the panel 16 on the boundary surface 2, for example, a ceiling.

Referring to FIG. 22, a user may separate the panel 16 which is exposed on the boundary surface 2 from the main body 10 and then take the filter 30 out through the buried opening BS of the boundary surface 2. Consequently, on the buried opening BS may be exposed a part of the fan 20.

Referring to FIG. 23, the user may separate the partition cover 109 from the main body 10, where the panel 16 has been removed, to expose the opening 108 and then separate the bell mouth 22 through the opening 108.

Referring to FIG. 24, the user may separate the fan wheel 23 from the main body 10 through the opening 108.

Referring to FIG. 25, the user may separate the motor cover 24 by unscrewing at the three positions (B, C and D shown in FIG. 20) of the motor cover 24.

As described above, it is possible for the user to disassemble each part of the fan 20 one by one through the second main body part 14 having a narrow width during replacement due to a breakdown of the fan 20.

Figure 26:
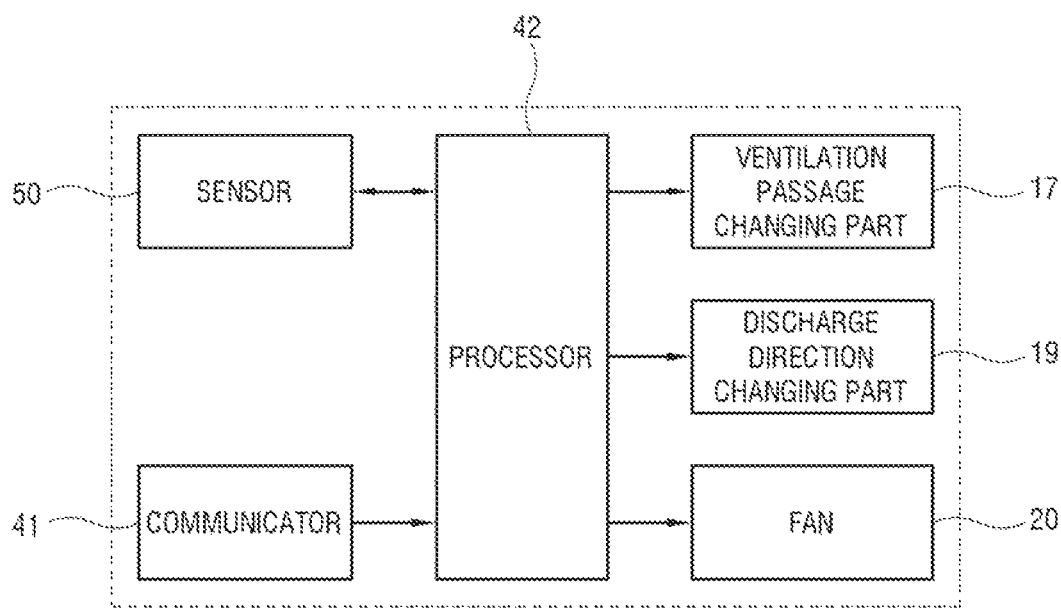
FIG. 26 is a block diagram illustrating configurations of the air purifier according to an embodiment of the disclosure.

FIG. 26 is a block diagram illustrating configurations of the air purifier 1 according to an embodiment of the disclosure.

Referring to FIG. 26, the air purifier 1 may include the ventilation passage changing part 17, the discharge direction changing part 19, the fan 20, a communicator 41, a processor 42 and a sensor 50. The ventilation passage changing part 17, the discharge direction changing part 19 and the fan have already been described and the description thereof will be omitted.

The communicator 41 and the processor 42 may be included in the driving circuit module 40 described above.

The communicator 41 may receive a control signal for remotely controlling an operation of the air purifier 1.

The communicator 41 may receive a setting input for an operational setting of the air purifier 1.

The communicator 41 may include a connection interface of a wireless network device such as Wi-fi, Bluetooth, ZigBee, Z-wave, RFID, WiGig, WirelessHD, UWB (Ultra-Wide Band), Wireless USB, NFC(Near Field Communication).

The communicator 41 may include an infra-red transmission and reception module for transmission and/or reception of a remote control signal.

The processor 42 may control the ventilation passage changing part 17, the discharge direction changing part 19 and the fan 20 according to a control signal or an operational setting value.

Specifically, the processor 42 may allow the fan 20 to operate in an air purification mode and control the discharge direction of air by rotating the discharge direction changing part 19 according to a control signal which has been previously set or is due to an instruction by a user.

The processor 42 may allow the fan 20 to operate in a ventilation mode and select one of the first ventilation passage 117 or the second ventilation passage 119 by rotating the ventilation passage changing part 17 according to a control signal which has been previously set or is due to an instruction by a user. The processor 42 may select one of the first ventilation passage 117 or the second ventilation passage 119 according to an output value of the sensor 50.

The processor 42 may include at least one general-purpose processor that executes a control program, which is installed in a non-volatile memory and at least a part of which is loaded to a volatile memory to be executed, and be embodied as a central processing unit (CPU), an application processor (AP) or a microprocessor.

The processor 42 may be embodied as to be included in a main system-on-a-chip (SoC) which is mounted on a printed circuit board that is included in the air purifier 1.

The sensor 50 may sense the quality of air which inflows from outside. The sensor 50 may include a sensor which senses carbon dioxide, carbon monoxide, oxygen, fine dust density, etc. which are contained in the air.

As described above, although the disclosure has described exemplary embodiments, the disclosure is not limited thereto and may be embodied variously within the scope of the claims.

What is claimed is:

1. A buried type air purifier comprising:
   a main body configured to be buried in a buried space through a buried opening which is provided on a boundary surface between a use space and the buried space, the main body having an intake passage and a discharge passage which take in and discharge air, respectively;
   a fan to guide air of the use space along the intake passage and the discharge passage; and
   a filter to filter the air,
   wherein the main body comprises:
      a first main body part having a fan accommodating part to accommodate the fan; and
      a second main body part having a cross sectional area, which is parallel with the boundary surface, being smaller than the first main body part, wherein the second main body part is formed to pass the intake passage and the discharge passage through which the air guided via the fan accommodated in the fan accommodating part passes.

2. The buried type air purifier according to claim 1, wherein the main body comprises a panel coupleable to an end part of the second main body part so that while the panel is coupled to the end part of the second main body part, the panel is toward the use space, and
   the panel has an intake opening through which air flows toward the intake passage and a discharge opening through which air flows from the discharge passage.

3. The buried type air purifier according to claim 2, wherein the panel has an area along a direction of the boundary surface that is larger than the buried opening.

4. The buried type air purifier according to claim 1, wherein a cross sectional area of the second main body part is smaller than the buried opening.

5. The buried type air purifier according to claim 1, wherein the first main body part has a cross sectional area, which is parallel with the boundary surface, that is larger than the buried opening.

6. The buried type air purifier according to claim 1, wherein the second main body part is formed to extend along a direction of a length with a width which is narrower than a width of the first main body part.

7. The buried type air purifier according to claim 6, wherein the main body has a lateral cross section along a direction of a length to be an 'L' shape.

8. The buried type air purifier according to claim 1, wherein the filter is provided in the intake passage.

9. The buried type air purifier according to claim 1, wherein the main body further comprises a first ventilation passage through which air inflowing from outside is delivered to the fan via the filter and a second ventilation passage through which air is directly delivered to the fan.

10. The buried type air purifier according to claim 9, wherein the main body further comprises a ventilation passage changing part which is controlled to open and close one of the first ventilation passage and the second ventilation passage.

11. The buried type air purifier according to claim 1, wherein the main body further comprises an opening on a boundary between the first main body part and the second main body part for inserting or drawing the fan and a partition cover covering the opening.

12. The buried type air purifier according to claim 1, wherein the fan comprises a bell mouth, a fan wheel, a motor cover and a motor which are separable from one another.

13. The buried type air purifier according to claim 12, wherein the motor cover comprises a locking part formed to lock and release with regard to the first main body part according to a forward and reverse turn, respectively.

14. The buried type air purifier according to claim 2, wherein the main body further comprises a discharge direction changing part for changing a discharge direction of the air which is discharged through the discharge opening.

* * * * *